(12) United States Patent
Risthaus et al.

(10) Patent No.: US 8,449,641 B2
(45) Date of Patent: May 28, 2013

(54) COPOLYAMIDE POWDER AS A PORE FORMER IN REGENERABLE CERAMIC PARTICULATE FILTERS

(75) Inventors: Martin Risthaus, Dorsten (DE); Hans-Joachim Wönicker, Stuttgart (DE)

(73) Assignee: Evonik Degussa GmbH, Essen (DE)

( * ) Notice: Subject to any disclaimer, the term of this patent is extended or adjusted under 35 U.S.C. 154(b) by 457 days.

(21) Appl. No.: 12/422,458

(22) Filed: Apr. 13, 2009

(65) Prior Publication Data
US 2009/0255402 A1   Oct. 15, 2009

(30) Foreign Application Priority Data

Apr. 11, 2008  (DE) .......................... 10 2008 001 125

(51) Int. Cl.
*B01D 46/00* (2006.01)
*B01D 39/14* (2006.01)

(52) U.S. Cl.
USPC .......................................... 55/523; 264/628

(58) Field of Classification Search
USPC 55/522–524; 422/169–172, 177–182; 60/297
See application file for complete search history.

(56) References Cited

U.S. PATENT DOCUMENTS

| | | | |
|---|---|---|---|
| 5,707,065 A | | 1/1998 | Azema et al. |
| 5,750,026 A * | | 5/1998 | Gadkaree et al. .......... 210/502.1 |
| 7,981,188 B2 * | | 7/2011 | Miao et al. ...................... 55/523 |
| 2002/0159926 A1 * | | 10/2002 | Hanaoka et al. .............. 422/177 |
| 2002/0162310 A1 * | | 11/2002 | Miller et al. ..................... 55/523 |
| 2004/0183055 A1 * | | 9/2004 | Chartier et al. ................ 252/500 |
| 2004/0244344 A1 * | | 12/2004 | Ichikawa ......................... 55/523 |
| 2005/0147541 A1 * | | 7/2005 | Ajisaka et al. ................. 422/177 |
| 2006/0154068 A1 * | | 7/2006 | Otsuka et al. ................. 428/402 |
| 2006/0292342 A1 * | | 12/2006 | Ohno et al. .................... 428/116 |
| 2007/0006561 A1 * | | 1/2007 | Brady et al. ..................... 55/523 |
| 2007/0039295 A1 * | | 2/2007 | Ohno .............................. 55/482 |
| 2007/0039297 A1 * | | 2/2007 | Kawata et al. .................. 55/523 |
| 2007/0077190 A1 * | | 4/2007 | Ohno ............................. 423/345 |
| 2007/0083033 A1 * | | 4/2007 | Fish et al. ...................... 528/310 |
| 2007/0119135 A1 * | | 5/2007 | Miao et al. ....................... 55/523 |
| 2008/0277632 A1 * | | 11/2008 | Chartier et al. .......... 252/520.21 |

FOREIGN PATENT DOCUMENTS

DE      197 53 249 A1    6/1999

OTHER PUBLICATIONS

Arkema, Orgasol Powders, Mar. 12, 2006.*

* cited by examiner

*Primary Examiner* — Duane Smith
(74) *Attorney, Agent, or Firm* — Oblon, Spivak, McClelland, Maier & Neustadt, L.L.P.

(57) ABSTRACT

A process for producing a regenerable ceramic particulate filter for diesel vehicles is described, wherein a material comprising silicon-containing particles is pyrolyzed in the presence of a polyamide. The resulting particulate filters have a BET surface area of >350 $m^2/l$.

19 Claims, No Drawings

COPOLYAMIDE POWDER AS A PORE FORMER IN REGENERABLE CERAMIC PARTICULATE FILTERS

FIELD OF THE INVENTION

The introduction of the EURO V standard and the voluntary commitment of the German automotive industry to use a filter in every new diesel vehicle from 2008 is giving rise to an enormous demand for such filter systems. Diesel particulate filters are also being used increasingly in the off-road sector.

DISCUSSION OF THE BACKGROUND

Particulates in diesel exhaust gas comprise principally of soot and uncombusted hydrocarbons. Depending on the engine used, the soot particle sizes are principally in the region of about 50-100 µm and are adsorbed on the surface of the filter until they are subsequently regenerated after appropriate coverage.

A functioning filter material which has become established for the specific use conditions in diesel filters is silicon carbide. Modern-day soot particulate filters are manufactured either by extrusion of SiC powder and subsequent recrystallization or directly from the individual silicon and carbon components. The silicization temperatures are in the range from 1500 to 2300° C. The particulate filter can be highly loaded and then burnt off thermally without any problems, the latter involving exhaust gas with a high oxygen content arriving at the filter at 600° C. in partial-load operation and the accumulated particles being degraded thermally.

To enhance the filter performance of the diesel particulate filters used, it is necessary to offer a maximum surface area on which the soot particles can be deposited. The extrusion process which has been used to date was able to create a relatively porous surface which, however, did not exhibit optimal adsorption properties.

DETAILED DESCRIPTION OF THE INVENTION

It has now been found that, surprisingly, a process as described in the claims can produce greatly improved particulate filters.

Thus, the present invention relates to a process for producing a regenerable ceramic particulate filter, comprising:

pyrolyzing a material comprising silicon-containing particles in the presence of a polyamide;

said regenerable ceramic particulate filter being suitable for a diesel vehicle.

In addition, the present invention relates to a regenerable ceramic particulate filter produced by the process as described above, wherein said regenerable ceramic particulate filter has a BET surface area of >350 $m^2/l$.

Within the context of the present invention, all values and subvalues are explicitly included in any ranges mentioned.

Within the context of the present invention % refers to wt. % unless otherwise specified.

When a certain amount of 5 to 15% by weight of a copolyamide powder is added to the extrusion material comprising SiC, and this polymer, after the extrusion, is burnt out again at approx. 350° C., this gives rise to a filter structure with significantly improved filter properties as a result of an enormous increase in the BET to values of >350 $m^2/l$ to about 800 $m^2/l$. Preference is given to using copolyamide powders which have a powder particle size distribution in the range from 0 to 200 µm, preferably in the range from 0 to 80 µm. The burning out of the polymeric components significantly alters the surface structure of the SiC material; more linear elements and channels form within the monolithic SiC structure, which enhance the filter performance and hence improve the efficiency of the filter cartridge. The incorporation of the polyamide powder and subsequent hydrolysis can significantly lower the exhaust gas backpressure owing to the effects described, which results in a significantly better filter action.

The ceramic shaped body is manufactured to EP 1 741 685 A1 for the intended use, and is notable for the use of a material composed of silicon-containing particles with a particle size of preferably 0.001 to 190 µm in combination with carbon-containing particles having a particle size of preferably 0.001 to 150 µm, which is pyrolyzed at 600 to 1000° C. Subsequent silicization with exclusion of oxygen at preferably 1150 to 1700° C. leads to the desired SiC shaped body.

After the silicization, the material has an internal surface area of 300 to 450 $m^2/g$. A pulverulent polymer is then added, preferably a copolyamide based on laurolactam, caprolactam, dodecanedioic acid and methylpentamethylenediamine. The copolyamide should preferably have a particle distribution of 0-80 µm, where 35-40%, preferably 40-60%, of the particles should be <50 µm. The melting point of the polymer should be <150° C., preferably <120° C. and optimally <110° C. VESTAMELT 730-P1 is particularly suitable for this end use.

The addition of the polyamide in the range of amounts of 5-15%, preferably 7-10%, before the pyrolysis allows the internal BET surface area to be increased significantly to 600 to 800 $m^2/g$. During the pyrolysis, the copolyamide is thermally decomposed virtually completely and leads to the formation of channel walls with a wall thickness in the range of 100-480 µm, preferably 220-350 µm. This leads to a sufficient stability coupled with a significantly enlarged surface area, which enables the production of significantly smaller filters. Specifically for the exhaust gas sector of diesel passenger vehicles, it is necessary to provide filters with relatively small volume.

The reduction of the wall thickness through the use of the copolyamide leads, even with a reduction by 70 µm and with a simultaneous increase in the channel density, to a significant increase in the internal surface area of the filter with the same volume.

The porous SiC-containing ceramic shaped body is suitable for use in a filter system, for example in the exhaust gas system of a motor vehicle or of an exhaust gas treatment system of an internal combustion engine, within which the porous SiC-containing ceramic shaped body is arranged. The ceramic shaped body may likewise find use as a catalyst support structure and as a corresponding catalyst system. Examples thereof are motor vehicles, ship engines, construction vehicles and machines with internal combustion engines which emit fine dust as a result of the system.

Having generally described this invention, a further understanding can be obtained by reference to certain specific examples which are provided herein for purposes of illustration only, and are not intended to be limiting unless otherwise specified.

Example

The ceramic shaped body produced for the studies was manufactured from an aqueous ceramic slurry using VESTAMELT 730-P1 powder based on EP 1 741 685 A1. To this end, silicon-containing particles with a particle distribution in the range from 0.001 to 75 µm were mixed with carbon-containing particles which have a particle distribution in the range from 0.001 to 35 µm, and with copolyamide powder with a particle distribution of 0 to 80 µm, and pyrolyzed at 830° C. As early as this stage, the thermal decomposition of the copolyamide powder took place, such that an increase in the internal surface area took place as a result of the burning-out process. In this present case, it was possible to increase the internal BET surface area to 780 m$^2$/g. Subsequently, silicization at 1450° C. formed the silicon carbide SiC, which constituted the ultimate filter material.

The following material composition was used:

| | |
|---|---|
| Activated carbon | 8.9% |
| Silicon powder | 40.0% |
| VESTAMELT 730-P1 | 8.0% |
| Water | 24.0% |
| Phenol resin | 12.5% |
| Assistants | 6.6% |

German patent application 10 2008 001125.8 filed Apr. 11, 2008, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for producing a regenerable SiC ceramic particulate filter, comprising:
mixing a material comprising silicon-containing particles and a material comprising carbon-containing particles, and a polyamide;
pyrolyzing the mixed materials comprising silicon- and carbon-containing particles in the presence of the polyamide;
thereby forming a silicon-carbide (SiC) ceramic shaped body, which is the filter; wherein silicon and carbon are the major materials of a monolithic SiC structure of the shaped body;
wherein said regenerable ceramic particulate filter is suitable for a diesel vehicle;
wherein linear elements and channels form within the monolithic SiC structure,
wherein a copolyamide powder is added to the material comprising silicon-containing particles, and
wherein the copolyamide powder has a powder particle size distribution in a range of <80 μm.

2. The process according to claim 1, wherein 5 to 15% of the copolyamide powder is added to the material comprising silicon-containing particles and then this polymer, after extrusion, is burnt out again at about 350° C.;
wherein said silicon-containing particles are silicon carbide particles.

3. The process according to claim 1, wherein the copolyamide powder is based on laurolactam, caprolactam, dodecanedioic acid and methylpentamethylenediamine.

4. The process according to claim 1, wherein the copolyamide powder has a melting point of <150° C.

5. The process according to claim 1, wherein the pyrolysis takes place at 600 to 1000° C.

6. A regenerable ceramic particulate filter produced by the process according to claim 1, wherein said regenerable ceramic particulate filter has a BET surface area of >350 m$^2$/l.

7. A regenerable ceramic particulate filter produced by the process according to claim 1, wherein said regenerable ceramic particulate filter has a BET surface area of from 600 to 800 m$^2$/l.

8. The process according to claim 1, wherein said filter is suitable for filtering particulates from diesel exhaust gas.

9. The process according to claim 8, wherein said particulates in diesel exhaust gas comprise soot, uncombusted hydrocarbons or a mixture thereof.

10. The process according to claim 9, wherein the soot particle sizes are about 50-100 μm.

11. The process according to claim 1, wherein 35-40 wt. % of the copolyamide particles have a particle size of <50 μm.

12. The process according to claim 2, wherein, during the pyrolysis, the copolyamide is thermally decomposed virtually completely and leads to the formation of channel walls in said material comprising silicon-containing particles with a wall thickness of from 100 to 480 μm.

13. The process according to claim 12, wherein the reduction of the wall thickness through the use of the copolyamide leads, even with a reduction by 70 μm and with a simultaneous increase in the channel density, to a significant increase in the internal surface area of the filter with the same volume.

14. The process according to claim 1, wherein said regenerable ceramic particulate filter is a porous SiC-containing ceramic shaped body.

15. The process according to claim 1, wherein said regenerable ceramic particulate filter is suitable as a catalyst support structure.

16. The process according to claim 1, wherein said regenerable ceramic particulate filter is suitable as a catalyst system.

17. A process for producing a regenerable SiC ceramic particulate filter, comprising:
mixing a material comprising silicon-containing particles and a material comprising carbon-containing particles, and a polyamide;
pyrolyzing the mixed materials comprising silicon- and carbide-containing particles in the presence of the polyamide;
thereby forming a silicon-carbide (SiC) ceramic shaped body, which is the filter; wherein silicon and carbon are the major materials of a monolithic SiC structure of the shaped body;
wherein said regenerable ceramic particulate filter is suitable for a diesel vehicle,
wherein from 5 to 15% of a copolyamide powder is added as the polyamide to the material comprising silicon- and carbide-containing particles and then a polyamide polymer, after extrusion, is burnt out again at about 350° C., wherein the copolyamide powder has a powder particle size distribution in a range of <80 μm; and
wherein the burning out of the polymer alters the surface structure of the material comprising the silicon carbide such that more linear elements and channels form within a monolithic silicon carbide structure.

18. The process according to claim 17, wherein the linear elements and channels within the monolithic silicon carbide structure enhance the filter performance and improve the efficiency of the filter cartridge.

19. The process according to claim 17, wherein the silicon-containing particles have a particle distribution in the range from 0.001-190 μm and the carbon-containing particles have a particle distribution in the range from 0.001-150 μm.

* * * * *